United States Patent

Milam

[19]

[11] Patent Number: 5,943,767
[45] Date of Patent: Aug. 31, 1999

[54] HOCKEY STICK BLADE TOOL

[76] Inventor: David L. Milam, 1400 Broadway, Pekin, Ill. 61554

[21] Appl. No.: 09/047,399

[22] Filed: Mar. 25, 1998

Related U.S. Application Data

[60] Provisional application No. 60/052,349, Jul. 11, 1997, and provisional application No. 60/057,195, Aug. 29, 1997.

[51] Int. Cl.$^6$ .................................................. B23P 19/04
[52] U.S. Cl. .............................. 29/800; 29/256; 29/426.5
[58] Field of Search .............................. 29/256, 258, 263, 29/266, 426.5, 898.08, 800

[56] References Cited

U.S. PATENT DOCUMENTS

| | | | |
|---|---|---|---|
| 4,783,893 | 11/1988 | Farino | 29/426.5 |
| 5,280,671 | 1/1994 | Marquart | 29/447 |
| 5,607,154 | 3/1997 | Meumann et al. | 473/562 |
| 5,690,850 | 11/1997 | Anderson | 219/535 |

*Primary Examiner*—S. Thomas Hughes
*Assistant Examiner*—Essama Omgba
*Attorney, Agent, or Firm*—Dickinson Wright PLLC

[57] ABSTRACT

A hockey stick blade tool comprises a base and a pair of clamp assemblies mounted to the base. One clamp assembly is fixed to the base with the other being movable along the base length. To remove a blade, the shaft of a hockey stick is clamped in the fixed assembly and the blade is clamped in the movable assembly. The movable assembly is translated along the base in a direction away from the fixed clamp assembly to withdraw the blade from the shaft. The base also includes provision to provide heat during blade removal. The base has a pivotal cover which encloses the joint area between the blade end and the shaft end. A source of heat can be directed underneath the cover to heat the joint area to facilitate blade removal.

16 Claims, 3 Drawing Sheets

HOCKEY STICK BLADE TOOL

This application claims the benefit of Provisional Application No. 60/052,349, filed Jul. 11, 1997, and Provisional Application No. 60/057,195, filed Aug. 29, 1997.

FIELD OF THE INVENTION

The present invention is directed to a hockey stick blade tool, and, in particular, to a tool adapted to remove or install the blade from a hockey stick.

BACKGROUND ART

Hockey sticks for use in the sport of hockey generally have three parts, a shaft, a hockey blade and a butt end. The shaft has a bore on either end, an end portion of the blade fitting within the bore on one end of the shaft for attachment therebetween. The butt end normally fits into the bore on the other end of the shaft.

Due to the nature of the sport of hockey, hockey stick blades are often damaged and need to be replaced. Replacement of a blade requires that the blade be removed from the shaft and replaced with a new blade.

Current prior art techniques for removing damaged blades from hockey stick shafts include physically pulling the blade from the shaft wherein one person grips the shaft with another person gripping the blade. This technique requires immense strength and, consequently, is not readily available when a person needs their hockey stick blade removed quickly.

Another technique employs a vise wherein the blade is clamped to the vise and a person pulls on the blade until it is removed.

Yet another system uses an over-the-door hanging device wherein the shaft butt end is inserted into the device and a person pulls on the blade.

As part of the techniques described above, heat may also be applied to the joint area where the blade end portion is inserted into the shaft end bore.

The techniques described above are not without their disadvantages. First, when individuals attempt to separate a blade from a stick shaft, a torque may be applied to the blade which may impart a twist to the blade, thereby effecting the stick's performance during play. Second, when using heat, persons can easily be burnt or inadvertent fires can be started, particularly when using open torch heat sources. Third, systems relying on a door for support may cause undue damage to the door. Fourth, if the blade should break off, the techniques requiring to grasping of the blade end are useless. Fifth, application of excessive amounts of heat to the joint area may compromise the properties or characteristics of the stick's shaft, particularly if the stick shaft is a polymer or composite material. Sixth, individuals with the necessary strength may not be available for blade removal.

In view of the disadvantage noted above, a need exists to provide an improved method and tool to remove hockey stick blades from the blade shaft. In response to this need, the present invention provides a tool which is operable by a single person and permits a quick and easy way to separate the hockey stick blade from the blade shaft. The tool is multi-purpose in that it also permits blade installation, butt end removal or installation, a safe and efficient application of heat, if necessary, and general vise capabilities for the stick shaft.

SUMMARY OF THE INVENTION

Accordingly, it is a first object of the present invention to provide a hockey stick blade tool that facilitates blade removal or installation.

Another object of the present invention is to provide a tool which permits removal of a broken off blade end from a hockey stick.

A still further object of the present invention is to provide a tool which permits the use of heat in a safe manner when removing a hockey stick blade.

One other object of the present invention is to provide a method of removing a blade from a hockey stick.

Other objects and advantages of the present invention will become apparent as a description thereof proceeds.

In satisfaction of the foregoing objects and advantages, the present invention provides a hockey stick blade tool comprising a base, a fixed clamp assembly mounted to the base and a movable clamp assembly mounted to the base. The fixed clamp and the movable clamp are spaced apart and aligned on an axis with the movable clamp slidable along the axis for manipulation of one component of a hockey stick or another component such as a blade end puller.

The tool can include means for directing heat at a joint area where an end portion of a hockey stick blade is connected to a hockey stick shaft. As part of the heat directing means, the top of the base can have a first opening between the fixed and movable clamp assemblies. The base also has a passageway interconnecting the first opening with a second opening adapted to receive a heat source. A heat source such as a hot air gun can be coupled to the second opening to direct hot air to the joint area. In a preferred embodiment, the joint area is enclosed by a pivotal cover which aids in uniform heating of the joint area and protects a tool operator from being burned. The base can include an insert or heat chamber to function as the passageway for joint area heating. The base can include a locking device to secure the heat chamber within the recess.

The movable clamp assembly comprises a clamp base supporting a fixed clamping block and a movable clamping block, the clamp base connected to a rack gear through a slot in the top of the base. The base supports a rotatable spur gear arranged on the base to mesh with the rack gear to drive the clamp base along the axis upon rotation of the spur gear.

The fixed clamp assembly comprises a clamp base mounted to the base, a fixed clamp block and a movable clamp block mounted to the fixed clamp base, the movable clamp block being attached by a threaded rod supported by the clamp base. Rotation of the threaded rod drives the movable clamp block for clamping the shaft of the hockey stick.

The tool can also utilize a blade end removing implement, one end being sized to be clamped in the movable clamping assembly and the other end threaded for attachment to a portion of a broken blade attached to a shaft of a hockey stick. The implement can remove the remaining portion of a broken off blade from the shaft.

The inventive tool can be used in a number of ways to repair or manipulate a hockey stick. Blades can be removed from or installed onto a shaft with the appropriate movement of the movable clamping assembly. Likewise, the butt end of a shaft can be removed from or installed onto a shaft. The blade and the butt end can be switched or the blade can be removed, rotated 180° and reinstalled if so desired. The tool can merely act as a vise for shaft cutting or the like. In addition, the blade manipulations described above can be performed with or without heat depending on the type of blade.

BRIEF DESCRIPTION OF THE DRAWING

Reference is now made to the drawings of the invention wherein.

DESCRIPTION OF THE PREFERRED EMBODIMENTS

The inventive hockey stick blade tool offers significant improvements over prior art techniques for separating a hockey stick blade from the blade shaft. With the inventive tool, a single person can affect blade removal without the need for undue force. Moreover, through the use of the inventive tool, application of unwanted torque to the hockey stick is avoided. The tool aligns the stick shaft and stick blade along an axis whereby the separating force applied to the blade is axial in nature, thereby preventing or minimizing any undue twisting or torque to the stick shaft.

The inventive tool can be used with or without application of heat. When heat is used, the heat is evenly applied to the joint area between the stick blade and stick shaft, thereby minimizing overheating portions of the stick shaft and possibly compromising its properties. Heating of the joint area can be enclosed to provide a safe environment for the operator and the tool surroundings.

The inventive tool is useful not only for stick blade removal and installation but also manipulation of the stick butt ends, if so desired. The inventive tool can also easily remove broken-off blade end portions or butt end portions if necessary. The tool can also be used as a stick vise for other stick manipulations such as cutting, sanding, shaping or the like.

Figure 1:
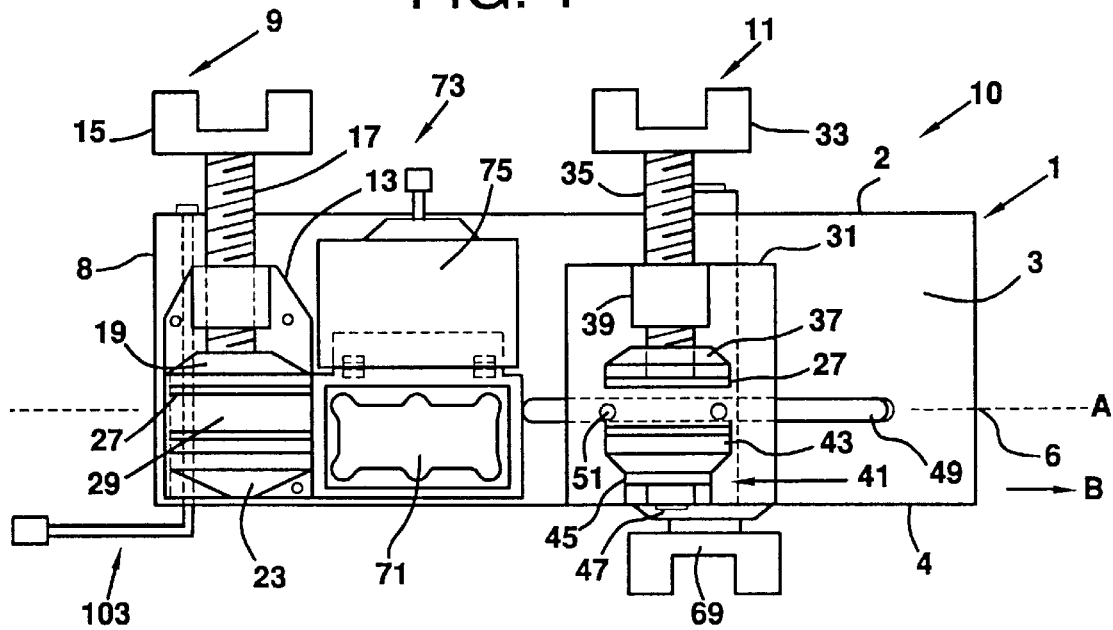
FIG. 1 is a top view of one embodiment of the present invention.
Figure 2:
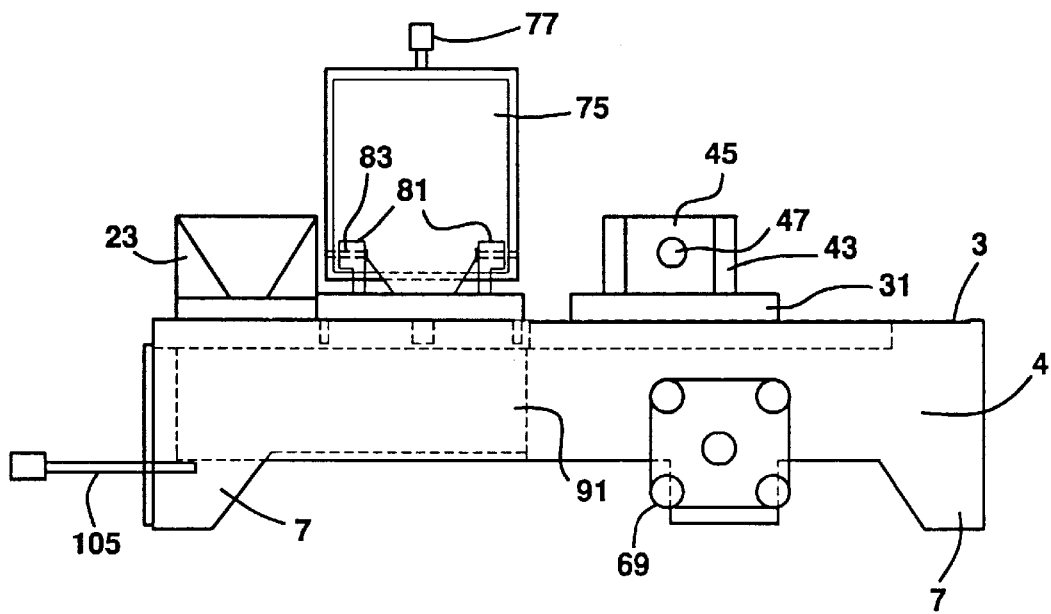
FIG. 2 is a front view of the embodiment of FIG. 1.
Figure 3:
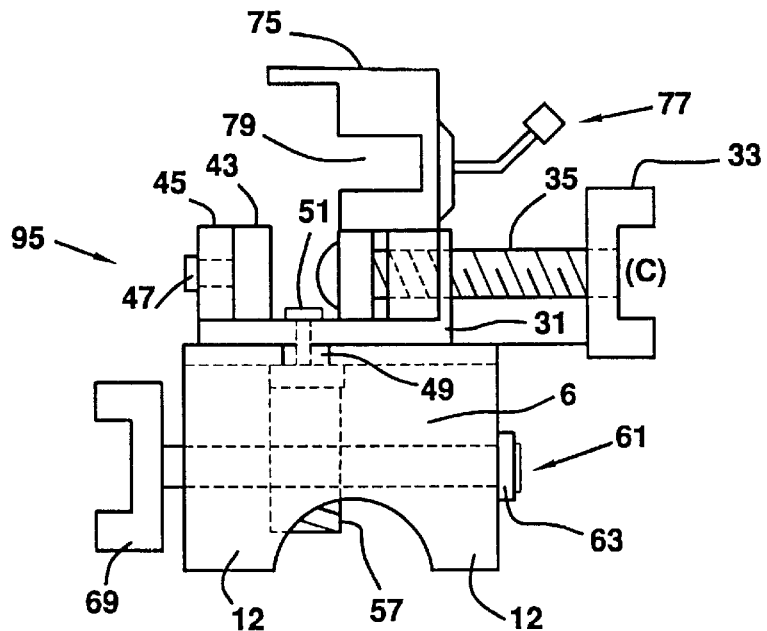
FIG. 3 is a right side view of the embodiment of FIG. 1.
Figure 4:
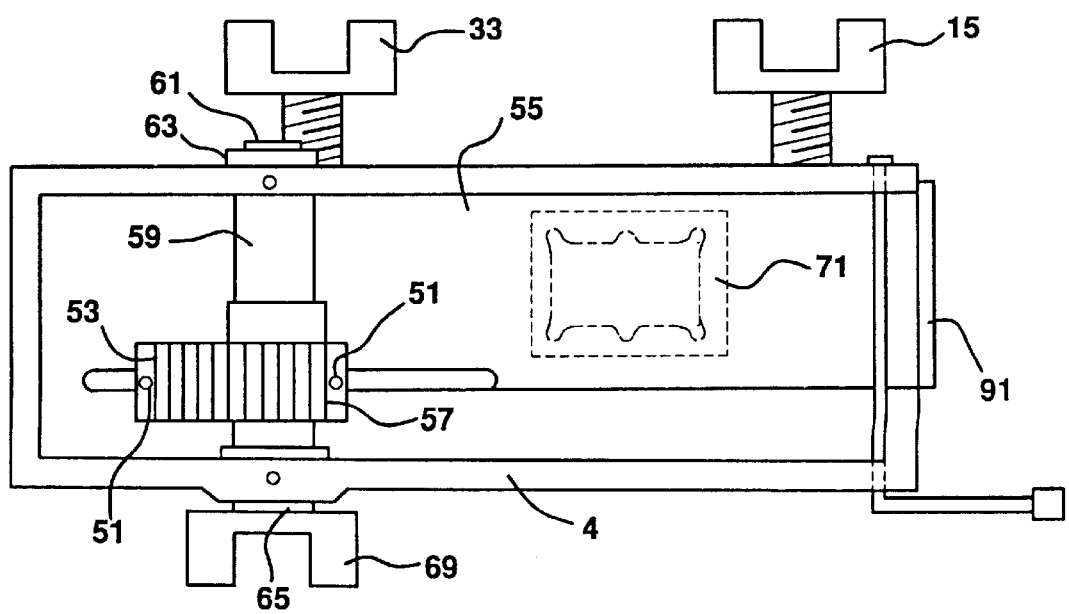
FIG. 4 is a bottom view of the embodiment of FIG. 1.

One embodiment of the inventive tool is depicted in FIGS. 1–5C. Referring now to FIGS. 1–4, the inventive tool is designated by the reference numeral 10 and includes a base 1 having a top 3 and four sides, 2, 4, 6 and 8. Referring to FIGS. 2 and 3, the side 4 is depicted with leg portions 7 with side 6 having leg portions 12. Although the base 1 is shown as rectangular in shape, other configurations can be used. In addition, other side configurations can also be employed as would be in the skill of the art.

Mounted to the top 3 of the base are two clamp assemblies, 9 and 11, respectively. The clamp assembly 9 is fixed to the base top 3 while the assembly 11 is moveable longitudinally along the base top 3. The clamp assembly 9 comprises a clamp base 13, a knob 15, a threaded bolt 17 and a slidable clamp block 19. The clamp base 13 has a threaded bolt guide 21 extending upwardly therefrom and a fixed clamp block 23. The clamp base 13 is shown with fastening bolts 25 securing it to the top 3. The clamp base 13 could be made as an integral part of the top 3 if so desired.

The knob 15 is attached to the threaded bolt 17 in any conventional matter, preferably using a set screw attachment. Similarly, the slidable clamp block 19 is attached to the threaded bolt 17. The slideable clamp block 19 can have a non-abrasive pad 27 which protects the hockey stick shaft when fixed in the clamp assembly 9. A similar pad could be utilized with the clamp block 23 as well as the blocks of clamping assembly 11.

The slidable clamp block 19 is rectangular in shape and sized to slide along the surface 29 of the clamp base 13 upon rotation of the knob 15. The clamping assembly 9 is sized to receive a hockey stick shaft between the blocks 19 and 23 for clamping thereof.

The clamping assembly 11 is similar in construction to clamping assembly 9 whereby clamping blocks are used to clamp the blade portion of a hockey stick. More specifically, the clamping assembly 11 has a clamp base 31, a knob 33, a threaded bolt 35 and a moveable clamp or sliding clamp block 37. The clamp base 31 includes a threaded bolt guide 39 and a fixed clamp block assembly 41. The assembly 41 includes a clamp block 43 mounted to a block support 45 via the bolt 47. Of course, the block assembly 41 could be fixed to the clamp base 31 as is the case for the block 23 of the clamping assembly 9.

The clamp base 31 of the assembly 11 is moveable along the slot 49 in the base top 3. The base 31 has two bolts 51 extending through the base and through the slot 49. The bolts 51 attach to a rack gear 53, see FIG. 4. The rack gear is positioned within a recess 55 formed by the base top 3 and sidewalls 2, 4, 6 and 8. Within the recess is a spur gear 57 mounted on a shaft 59. The shaft 59 is mounted for rotation in the base 1, one end 61 secured to the base by the brass bushing 63. The other end 65 extends through the sidewall 4 and is secured to the knob 69 by a conventional fastening means, e.g., a set screw or the like.

As stated above, the tool 10 can be used to remove or install a stick blade, extract broken ends of the blade, install or remove a blade butt end or just use the tool as a vise for stick cutting or other manipulation.

To remove a hockey stick blade, the shaft of the blade is clamped between blocks 19 and 23, see FIG. 1. The hockey stick blade is clamped between the blocks 37 and 43. The knob 69 is rotated clockwise as viewed from FIG. 2 to translate the clamp base 31 along the axis A and in the direction B as shown in FIG. 1. The translating or sliding motion of the clamp base 31 pulls the blade end from the stick end. A new blade can then be installed by reversing the procedure described above.

Similarly, a blade butt end could be clamped between blocks 37 and 43 and removed with the same rotation of the knob 69 as described above for blade removal.

The inventive tool can also be used to switch a blade with a butt end or remove a blade, rotate the shaft 180° and replace the blade. The latter procedure is useful if the shaft is bowed in one direction and a player wants to continue to use the shaft.

The inventive tool also has the option to apply heat during the hockey stick manipulation process described above. Referring back to FIGS. 1–3, the top 3 has a through opening 71 positioned between the clamp bases 13 and 31. The opening 71 aligns with the joint area of the shaft end and the blade end. Optionally, the opening 71 can be enclosed by a pivoting cover assembly 73. The assembly 73 includes a cover 75 having a rubber-tipped handle 77 extending therefrom. The cover 75 has slots 79 on opposing ends, the slots sized to receive the joint area of the hockey stick when the cover is pivoted downwardly, thereby enclosing the opening 71. The cover 75 is pivotally supported by a pair of supports 81 extending upwardly from the top 3 of the base 1. The supports 81 receive pins 83, the pins 83 secured to the cover 75, thereby permitting the cover 75 to pivot about the axes of the pins 83. The cover 75 not only provides a uniform heating of the joint area but also protects an operator from possible burning from the heat applied to the joint area.

Figure 5A:
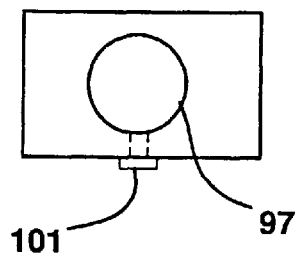
FIGS. 5a–5c show end, top and side views of the heat chamber shown in FIG. 4.
Figure 5B:
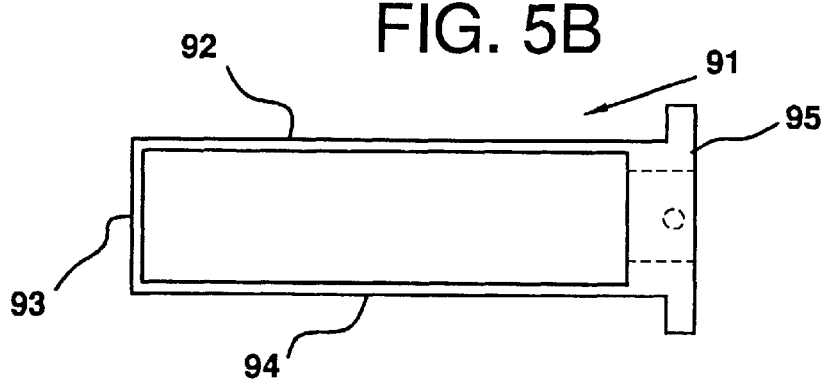
Figure 5C:
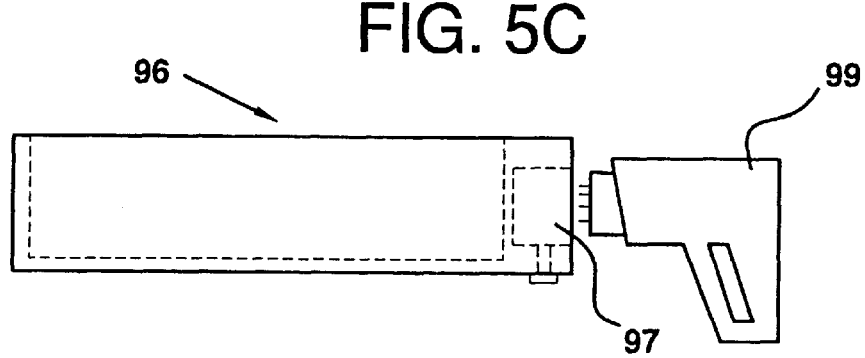

While any means or passageway can be utilized to direct heat to the opening 71 from a heat source, the tool 10 utilizes a heat chamber 91 as depicted in FIGS. 2, 4 and 5A–5C. The heat chamber 91 has four sides 92, 93, 94 and 95 and an open top 96. The side 95 has a through hole 97 which couples with a hot air gun 99 for application of heat to the joint area through the open top 96 and opening 71 in the base top 3. The heat gun 99 can be secured in the opening 97 using a set screw 101 as shown in FIG. 5A.

The chamber 91 is inserted through an opening (not shown) in side 8, into the recess 55 of the base 1 and held in place using a toggle bolt 103. The toggle bolt 103 is a piece of mild steel with a slight bend in the middle. The bend rests against the underside of the heat chamber upon rotation of the handle 105 of the toggle bolt 103. The bent middle portion biases against the underside of the heat chamber 91 to secure it in place during the heating of the joint area for blade removal. It should be understood that the heat chamber is but one embodiment of the inventive tool and other arrangements could be employed to direct a source of heat to the joint area of the stick shaft and stick blade. For example, a flexible conduit could be used to interconnect the opening 71 and a source of heat such as the hot air gun 99. The heat source could be directed through the cover. Other means as would be within the skill of the art could also be employed with the inventive tool. Again, the ability to apply heat to the joint area is optional. In fact, certain blade construction may call for no or minimal heat application. In such case, the blade could be removed using just the clamping assemblies 9 and 11, without application of any heat.

The clamping assemblies 9 and 11 are exemplary and other configurations could be utilized providing that they clamp both the hockey stick shaft and blade for blade removal or installation.

Figure 6:
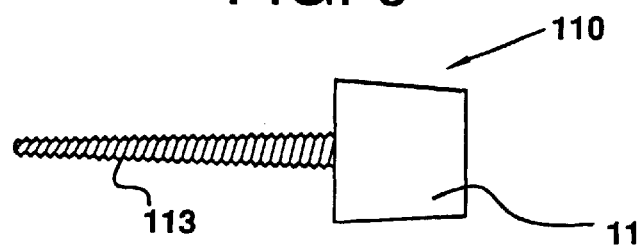
FIG. 6 shows an extractor tool for use with the invention.

The inventive tool can also be utilized to remove the broken end of a hockey blade. In this use, the implement 110 of FIG. 6 can be employed. More particularly, the implement 110 includes a body 111 and a threaded screw 113 extending therefrom. The screw 113 is screwed into the broken-off blade end remaining in the hockey stick shaft end. Once the screw is securely embedded in the broken-off blade end, the body 111 is clamped between the blocks 37 and 43 of the clamping assembly 11 and the stick shaft is clamped between the blocks 19 and 23. The knob 69 can then be rotated whereby the clamp base 31 travels along the axis A in the direction B as shown in FIG. 1 to remove the broken-off blade end. A new blade can then be inserted into the shaft bore. Preferably, the body 111 is sized to correspond to the cross-sectional size of the hockey stick blade when clamped between the blocks 37 and 43 and the screw is centered on the body 111. In this way, a true axial separation force is still maintained for blade end removal. Of course, other types of implements could still be used providing they can be clamped in the assembly 11 and attached to the broken off blade end.

The inventive tool 10 can be made of any material but the base and clamping assemblies are preferably made from cast aluminum where appropriate. Likewise, the heating chamber could be a casting as could be the cover 75. Other means than those disclosed could also be employed to translate the base clamp 31 as would be within the skill of the art.

The base 1 can be free-standing or mountable to a table, bench or the like. The mounting can be done in any fashion, for example, through the use of clamps, fasteners or the like. By securing the base to a surface, one person can easily remove the blade from a hockey stick.

As such, an invention has been disclosed in terms of preferred embodiments thereof which fulfill each and every one of the objects of the present invention as set forth above and provides a new and improved hockey stick tool adapted for hockey stick repair and a method of use.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A hockey stick tool comprising:
 a) a base;
 b) a fixed clamp assembly mounted to the base; and
 c) a movable clamp assembly mounted to the base, the fixed clamp and the movable clamp being spaced apart and aligned on an axis, the movable clamp having a planar surface which is slidably mounted on a corresponding surface on the base and adapted for movement along the axis, the movable clamp assembly comprising a driving mechanism linked to the moveable clamp for sliding the clamp along the surface of the base.

2. The tool of claim 1, comprising means for directing heat at a joint area where at least a portion of a hockey stick blade is connected to a hockey stick shaft.

3. The tool of claim 1, comprising a first opening in a top of the base between the fixed and movable clamp assemblies, and a passageway interconnecting the first opening with a second opening in the base sized to receive a heat source.

4. The tool of claim 3, wherein the base has a pivotal cover enclosing the first opening to concentrate heat at the joint area.

5. The tool of claim 1, wherein the moveable clamp of the movable clamp assembly further comprises a clamp base supporting a fixed clamping block and a movable clamping block, the clamp base connected to a rack gear through a slot in the top of the base, and wherein the base supports a rotatable spur gear arranged on the base to mesh with the rack gear to drive the clamp base along the surface upon rotation of the spur gear.

6. The tool of claim 5, wherein the fixed clamp assembly comprises a clamp base mounted to the base, a fixed clamp block and a movable clamp block mounted to the clamp base, the movable clamp block being attached to a threaded rod supported by the clamp base, rotation of the threaded rod driving the movable clamp block for clamping a shaft of the hockey stick.

7. The tool of claim 6, comprising a first opening in a top of the base between the fixed and movable clamp assemblies, a passageway interconnecting the first opening with a second opening adapted to receive a heat source.

8. The tool of claim 7, wherein the passageway further comprises a heat chamber sized for sliding insertion within a recess formed by the base, the heat chamber having an inlet to connect to the heat source and an outlet in communication with the first opening in the base when the heat chamber is inserted within the base.

9. The tool of claim 8, wherein the base includes a locking device to secure the heat chamber within the recess.

10. The tool of claim 1, wherein the fixed clamp assembly comprises a clamp base mounted to the base, a fixed clamp block and a movable clamp block mounted to the clamp base, the movable clamp block being attached to a threaded rod supported by the clamp base, rotation of the threaded rod driving the movable clamp block for clamping a shaft of the hockey stick.

11. A hockey stick tool comprising:

a) a base;

b) a fixed clamp assembly mounted to the base; and c) a movable clamp assembly mounted to the base, the fixed clamp and the movable clamp being spaced apart and aligned on an axis, the movable clamp adapted for movement along the axis, the base having a first opening in a top thereof between the fixed and movable clamp assemblies, a passageway interconnecting the first opening with a second opening in the base sized to receive a heat source, wherein the passageway further comprises a heat chamber sized for sliding insertion within a recess formed by the base, the heat chamber having an inlet to connect to the heat source and an outlet in communication with the first opening in the base when the heat chamber is inserted within the base.

12. The tool of claim 11, wherein the base includes a locking device to secure the heat chamber within the recess.

13. A hockey stick tool comprising:

a) a base;

b) a fixed clamp assembly mounted to the base;

c) a movable clamp assembly mounted to the base, the fixed clamp and the movable clamp being spaced apart and aligned on an axis, the movable clamp adapted for movement along the axis; and d) a blade end tool, one end being sized to be clamped in the movable clamping assembly and the other end threaded for attachment to a portion of a broken blade attached to a shaft of a hockey stick.

14. A hockey stick tool comprising:

a) a base having sides and forming a recess;

b) a first clamp assembly fixedly mounted to the base;

c) a second clamp assembly slidably mounted to the base, the first and second clamp assemblies being spaced apart and aligned on axis;

d) a cover pivotally mounted to the base and arranged between the first and second clamp assemblies, the cover enclosing an opening in the base; and e) a heat chamber sized for slidable insertion in the recess, the heat chamber having an outlet configured to communicate with the opening in the base and an inlet adapted to receive a source of heat;

f) whereby the second clamp assembly is adapted to clamp to a blade of a hockey stick and the first clamp assembly is adapted to clamp to a shaft of a hockey stick, translation of the second clamp assembly with respect to the first clamp assembly removing the blade from the hockey stick.

15. The tool of claim 14, wherein the second clamp assembly further comprises a clamp base mounted for sliding travel in a slot in a top of the base, a rack gear arranged within the recess and connected to the clamp base, a spur gear arranged within the recess and rotatably mounted to a shaft supported by the base, the shaft terminating on one end thereof in a knob, knob rotation driving the spur gear and the rack gear so that the clamp base slides along the slot to move the second clamp assembly with respect to the first clamp assembly.

16. The tool of claim 14, further comprising a blade end tool, one end being sized to be clamped in the movable clamping assembly and the other end threaded for attachment to a portion of a broken blade attached to a shaft of a hockey stick.

* * * * *